(12) United States Patent
Karam

(10) Patent No.: US 8,099,611 B2
(45) Date of Patent: Jan. 17, 2012

(54) POWERED COMMUNICATIONS INTERFACE WITH PRE-OPERATING MODE USING LOW VOLTAGES AND CURRENTS FOR INFORMATION SIGNALING

(75) Inventor: Roger Karam, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 623 days.

(21) Appl. No.: 12/249,101

(22) Filed: Oct. 10, 2008

(65) Prior Publication Data

US 2010/0095136 A1   Apr. 15, 2010

(51) Int. Cl.
G06F 1/00 (2006.01)
G06F 1/26 (2006.01)

(52) U.S. Cl. ........ 713/300; 713/320; 713/323; 713/324; 455/127.1; 702/57; 324/539

(58) Field of Classification Search .................. 713/300, 713/320, 323, 324
See application file for complete search history.

(56) References Cited

U.S. PATENT DOCUMENTS

| | | | | |
|---|---|---|---|---|
| 7,299,368 B2 * | 11/2007 | Peker et al. | .................... | 713/300 |
| 7,426,374 B2 * | 9/2008 | Dwelley et al. | ............ | 455/127.1 |
| 7,849,333 B2 * | 12/2010 | Schindler | ...................... | 713/300 |
| 2006/0082220 A1 | 4/2006 | Karam et al. | | |
| 2006/0092000 A1 * | 5/2006 | Karam et al. | ............ | 340/310.11 |
| 2006/0100799 A1 * | 5/2006 | Karam | ............................ | 702/57 |
| 2008/0244284 A1 * | 10/2008 | Karam et al. | ................. | 713/300 |
| 2010/0042855 A1 * | 2/2010 | Karam | .......................... | 713/310 |
| 2010/0045302 A1 * | 2/2010 | Karam | .......................... | 324/539 |

* cited by examiner

Primary Examiner — Brian Misiura
(74) Attorney, Agent, or Firm — BainwoodHuang

(57) ABSTRACT

A powered device can provide information to another device (such as a power sourcing equipment) via a powered communications interface when operating power is not being provided to the powered device via the powered communications interface, enabling a variety of functions and applications. Relatively low voltages and currents of the type used for detection and classification of the powered device are used in an extended way to achieve the communications. The power sourcing equipment performs additional detections and/or classifications, and the powered device responds by presenting corresponding signatures or identity networks that convey additional information beyond the presence and power requirements of the powered device. As an example, a powered device can present a sequence of signatures signifying that power should be applied to the powered device notwithstanding an active policy of withholding power in furtherance of a power conservation scheme. Many other kinds of information can be signaled for a variety of system-level purposes and using a variety of signal forms using the relatively low signaling voltages and currents.

21 Claims, 9 Drawing Sheets

POWERED COMMUNICATIONS INTERFACE WITH PRE-OPERATING MODE USING LOW VOLTAGES AND CURRENTS FOR INFORMATION SIGNALING

BACKGROUND

The invention pertains to the field of powered communications interfaces via which power is provided to remote operating circuitry.

Powered communications interfaces are utilized in data communications systems to provide operating power to devices over the same wires used to carry data communications signals, in a manner analogous to the traditional telephone system in which DC operating power is provided to subscriber equipment over the twisted-pair telephone wires. Today, there is widespread use of so-called "power over Ethernet" or POE technology, in which DC operating power is provided to digital telephones, video cameras, and other data terminal equipment over unshielded twisted pair (UTP) cables connecting the data equipment with centralized data switches. In POE parlance, a device receiving power in this fashion is termed a "powered device" or PD, while a device that provides power for use by PDs is termed a "power sourcing equipment" or PSE.

According to applicable POE standards, a PSE must detect and classify a PD before PSE power is delivered to the PD. The PD presents a 25 k$\Omega$ signature resistor (R-signature) to a PSE to request the delivery of POE power. During the detection process, a PSE successively applies relatively low voltages V1 and V2 (less than 15 V) while measuring corresponding currents I1 and I2 conducted by the PD, then it calculates a resistance value R-signature=(V2-V1)/(I2-I1). If this calculation yields an R-signature in a suitable range about 25 k$\Omega$ (the valid identity network for a PD requesting power), the PSE proceeds to a classification process to ascertain the power requirements of the PD. The PSE applies a voltage in the range of 15 v-20 v while measuring the current drawn by the PD, and then uses the current value to classify the PD according to a set of values specified in the standard. Traditionally the standard allows 5 classes (labeled 0 to 4), and a more recent version of the standard allows for additional devices that require higher power than previously defined.

Conventionally, once detection and classification are complete, a PSE automatically applies full power (48 volts and a class-based maximum current) to the PD via the powered communication interface as long as the PSE has sufficient incremental power available to do so. The PD uses this POE power to operate. In many cases, the 48 V power is supplied to one or more DC-DC converters in the PD which transform the 48 V power into other specific operating voltages as required by the PD operating circuitry, such as ±15 V, +3.3 V, etc. In particular, the 48 V power is used to provide power to communications circuitry within the PD that effects high-speed data communications to/from the PD over the same twisted pairs used to carry the POE power. This circuitry is commonly referred to by the term PHY, referring to its "physical layer" communications functionality according to the well-known hierarchical description of data network communications.

US Patent Application Publication US 2006/0082220 A1 shows communications over a wired data telecommunications network between and among power sourcing equipment (PSE), powered devices (PDs), and the like which take place over the wired medium by modulating an inline power signal. Any suitable communications protocol may be used and any suitable modulation scheme can be used. Examples of information to be communicated include: changing power requirements or capabilities (higher or lower) and acknowledgements thereof (permitting finer power class gradation than available under existing standards); sensor data; wireless data converted to wired data; status signaling, and the like. Such communications may be used for a number of purposes including supporting redundant provision of services over a network.

BRIEF DESCRIPTION OF THE DRAWINGS

Certain objects, features and advantages will be apparent from the following description of particular embodiments of the invention, as illustrated in the accompanying drawings in which like reference characters refer to the same parts throughout the different views.

DETAILED DESCRIPTION

Overview

Figure 1:
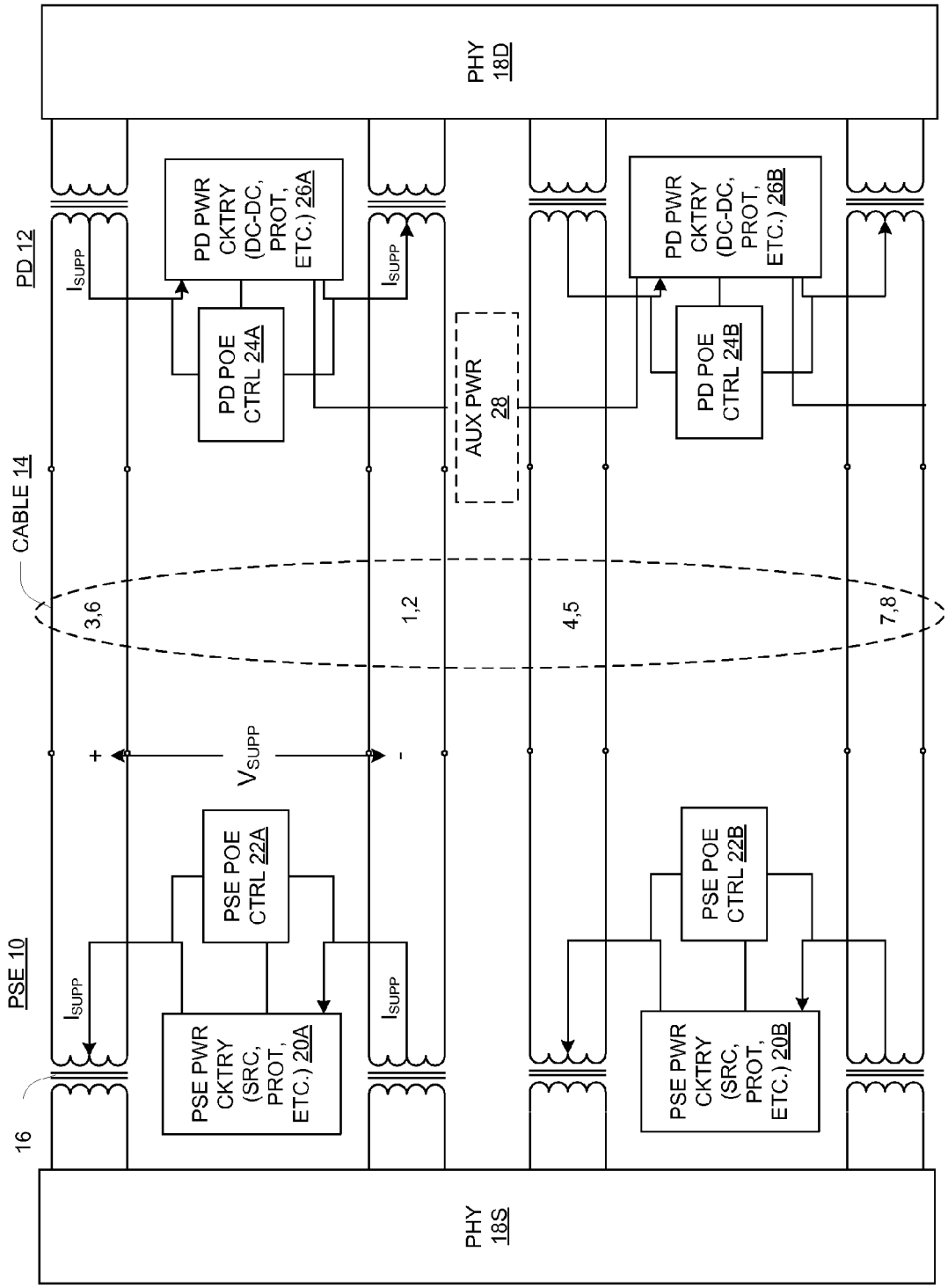
FIG. 1 is a block diagram of a system employing a powered communications interface according to an embodiment of the invention.

In systems employing powered communications interfaces, such as POE systems, there can be a need for communications to/from a powered device (PD) before the PD is receiving power from the power sourcing equipment (PSE). As but one example particularly applicable to POE systems, the PSE may be operating in accordance with a power conservation policy such that under certain conditions it refrains from supplying power to a PD even when detection and classification indicate the presence of a valid PD that requires power. For example, power may be withheld during non-working times or whenever a user associated with the PD is known to be absent, in the interest of reducing system power consumption. During such times when power is being withheld, it may be useful to enable a PD to supply a signal to the PSE indicating that conditions have changed (e.g., the user is now present) or that there are special conditions that override the policy (such as an emergency). However, such communications are generally not possible in traditional POE systems, because (1) the normal signaling that occurs in the absence of power is limited to detection and classification only, and (2) the circuitry that could be used for communications (such as PHY circuitry) is not receiving operating power, and therefore cannot be used for such signaling. Thus, traditional POE systems suffer from the inability to effect signaling between a PD and a PSE when normal operating power is not being supplied to the PD via the powered communications interface.

A system and method are disclosed by which a PD can provide information to another device (such as a PSE) via a powered communications interface when operating power is not being provided to the PD via the powered communications interface, enabling a variety of functions and applications that may otherwise be difficult or impossible to realize. Relatively low voltages and currents of the type used for detection and classification are used in an extended way to achieve the information signaling. In one class of embodiments, the PSE performs additional detections and/or classifications, and the PD responds to the additional detections and/or classifications by presenting corresponding signatures or identity networks that convey additional information beyond the bare presence and power requirements of the PD. As an example, a PD can present a sequence of signatures that signify to the PSE that power should be applied to the PD notwithstanding an active policy of withholding power in furtherance of a power conservation scheme. Many other kinds of information can be signaled, for a variety of system-level purposes. And the signaling can take a variety of forms, including illustrative examples given herein.

In the description below, reference is made to signals that either do or do not comply with published standards. Such signals are to be understood as satisfying the description of these signals in published standards for interoperability of network devices from different manufacturers, such as the IEEE 802.3af and 802.3at standards for power over Ethernet. Non-standard signals are those that do not satisfy such published standards, and these may be specific to only one or a few manufacturers of network equipment and enable only manufacturer-specific exchange of information between power-sourcing equipment and powered devices.

Description of Example Embodiments

FIG. 1 illustrates a powered communications interface in the form of a four-pair Ethernet connection including circuitry supporting the delivery of both communications and power between a power-sourcing equipment (PSE) 10 and a powered device (PD) 12 over a cable 14. The cable 14 includes eight wires arranged as four twisted pairs, shown as pairs (3,6), (1,2), (4,5) and (7,8). In one common configuration, one set of two pairs (e.g. (3,6) and (1,2)) provides a first full-duplex high-speed communications channel, i.e., one pair of the set carries data in one direction while the other pair carries data in the opposite direction (10/100baseT), and the other set of two pairs (e.g. (4,5) and (7,8)) provide full-duplex high-speed communications channel to deliver 1000baseT or higher speeds. Data is conveyed on each pair by differential signaling at high-speed rates such as 100 megabits per second, 1 gigabit per second, etc. Signal transformers 16 perform AC coupling of the data signals between the cable 14 and respective physical-layer (PHY) integrated circuits 18S, 18D.

Additionally, in the illustrated configuration each set of two pairs of wires also forms part of a respective first or second power delivery channel. A first power delivery channel includes pairs (3,6) and (1,2) and their connected transformers 16 as well as PSE power circuitry (PSE PWR CKTRY) 20A, a PSE POE controller (PSE POE CTRL) 22A, a PD POE controller (PD POE CTRL) 24A, and PD power circuitry (PD PWR CKTRY) 26A. A second power delivery channel includes pairs (4,5) and (7,8) and their connected transformers 16 as well as PSE power circuitry 20B, PSE POE controller 22B, PD POE controller 24B, and PD power circuitry 26B. An auxiliary power source (AUX PWR) 28 (such as an external AC-DC converter) may be connected to one or both of the PD power circuitry 26A, 26B as shown.

The PSE power circuitry 20 of each power delivery channel includes various components that provide DC power to the PD 12 via the cable 14, specifically by generating a DC voltage Vsupp which is applied across the respective center taps of the transformers 16 of the power delivery channel, and a DC current Isupp which flows in the power delivery channel. These components, which are not specifically shown in FIG. 1, include a 48-volt DC power supply, a power field-effect transistor (FET) used as a switch to selectively couple or de-couple the 48-volt supply to/from the cable 14, a sense resistor for detecting the magnitude of current flow, etc. The PSE POE controller 22 of each power delivery channel includes control circuitry for controlling the operation of the associated PSE power circuitry 20 in accordance with POE specifications, as well as control circuitry that performs additional functions as specifically described herein.

Similarly, the PD power circuitry 26 of each power delivery channel includes various components that receive DC power from the PSE 10 via the cable 14 for use within the PD 12. Typical components (again not shown) include a DC-DC converter, protection circuitry, etc. For those PDs supporting an auxiliary power source 28, the PD power circuitry 26 typically includes bridge circuitry that steers power from either the cable 14 or the auxiliary power source 28 to a powered circuit of the PD 12 while providing protection to avoid unsafe or potentially damaging currents. The PD POE controller 24 of each power delivery channel includes control circuitry that controls the flow of DC power from the cable 14 to the PD power circuitry 26 in accordance with POE specifications, as well as control circuitry that performs additional functions as specifically described herein.

While in FIG. 1 each set of pairs has its own autonomous PD controller 24, it will be appreciated that in an alternative arrangement it may be possible to use a single controller for both sets of pairs. Additionally, while in FIG. 1 the entire four-pair interface is described as a powered communications interface, in alternative embodiments a two-pair interface may constitute a powered communications interface. The signal transformers 16 constitute one type of coupling circuitry for coupling the data signals between the PSE 10 or PD 12 to/from the cable 14; other forms of coupling circuitry can be used.

There can be a need to detect and communicate with PD devices without applying POE voltages above 30 volts; such functionality may prove very useful for end users and network administrators alike. Communications improve the performance and capabilities of POE systems. There may be many applications for additional detections and communications. In one example involving a power-management strategy, there may be a need to shut down a device to save energy. This leaves such a device without its PHY-based communications, because the PHY 18 normally is provided operating power derived from the DC operating power represented by Vsupp and Isupp in FIG. 1. Support for communications and additional detections in this powered-off operating condition can enable an end-user to request power at will, especially when the PD 12 is powered down and is constantly presenting a valid 25 k identity network to an attached PSE. To implement such a "green-POE" policy (power down devices to conserve energy), a PSE may be ordered to hold back its 48 v POE power even while a PD may be presenting a valid signature to the PSE. The order may be provided by some higher-level control mechanism such as system software, network administrator, etc. A user would preferably receive an indication about the status of the PD, i.e. that the PD is visible to the PSE and is powered down due to a green-POE policy, and in return the user is given the means to communicate back to the switch the need for modifying or overriding the policy.

For purposes of this description, the result of a detection and/or classification is variously termed a "signature" or an "identity network". Both terms refer to the relationship between a voltage or voltages supplied by the PSE 10 and a corresponding current or currents conducted by the PD 12 (and supplied by the PSE 10). The PD can be said to present a different "signature" or "identity network" to the cable 14 by virtue of corresponding different currents supplied and measured by the PSE 10 at the same voltage or voltages.

A new identity network is used to signal the presence of the user to the PSE 10 doing detections while attached to the PD 12 presenting a 25 k valid signature. One example of such an identity network can be made using a push-button at the PD 12. Using a normally closed switch in series with a 25 k resistor, a signature of (25 k)-(open)-(25 k) can be obtained which corresponds to the sequence of (not pressed)-(pressed)-(not pressed) for the button. The PSE 10 detects the change in the value of the identity network from a 25 k resistor to an open and back to a 25 k resistor again, and this change in the value of the 25 k identity network under these conditions represents a new identity network to communicate back to a PSE the presence of a person or the need for supplying immediate POE power. Another example of such a new identity network is the detection of a 25 k resistance followed by a short (maximum current) followed by a 25 k resistor, which can be provided by a normally-open switch in parallel with the 25 k signature resistor. Other identity networks may be realized as changes in classification currents or detection signatures, or both, due for example to the trigger of circuitry using sensors (light, motion and sound sensors) which might be powered from the PSE 10 at voltages less than 30 v, while the PSE 10 is awaiting a signal before applying POE power again. More details regarding this form of signaling between the PD 12 and PSE 10 are provided below.

Figure 2:
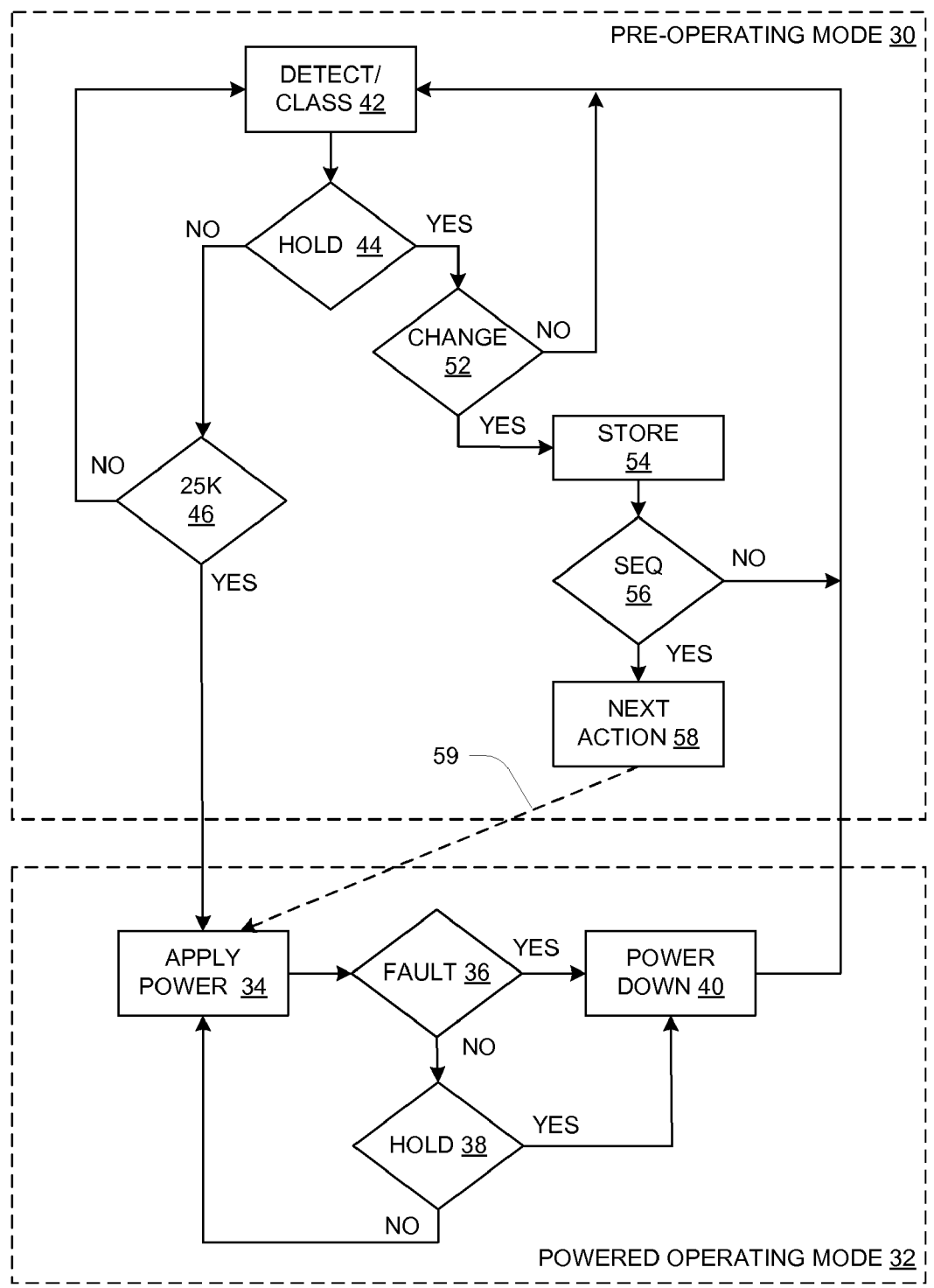
FIG. 2 is a flow diagram depicting a first method of operation of the system of FIG. 1 according to a one embodiment.

FIG. 2 illustrates certain power-delivery operation of the circuitry of FIG. 1. Operation is shown as divided between a pre-operating mode 30 and a powered operating mode 32. In the powered operating mode 32, the PSE 10 utilizes the PSE power circuitry 20 and PSE POE controller 22 to provide DC power to the PD 12 via the cable 14, and the PD 12 utilizes the PD POE controller 24 and PD power circuitry 26 to receive the DC power and make it available for use within the PD 12 (e.g., by providing operating power to the PHY 18D). In the pre-operating mode 30, this DC operating power (also referred to herein as "POE power") is not being supplied. One important purpose of the pre-operating mode 30 is to test for certain conditions to determine whether it is safe for the PSE 10 to supply the DC operating power to the cable 14. For example, the PSE 10 tests for the presence of a 25 k resistor connected to the cable 14, which indicates whether the PD 12 is connected, and further tests for other circuit conditions that indicate a particular power class of the PD 12. Beyond these functions, the PSE 10 and PD 12 may engage in additional signaling for a variety of additional functions, examples of which are described more particularly below.

More specifically, in the powered operating mode 32, at step 34 the PSE 10 provides DC operating power to the PD 12 via the cable 14. Under these conditions the full 48 volt supply voltage Vsupp appears across the center taps of the transformers 16 of the power delivery channel, and a corresponding supply current Isupp is supplied to the power delivery channel as dictated by the load at the PD 12, subject to current limits and protections enforced by the PSE POE controller 22. While power is being supplied, the PSE 10 also checks for a fault condition as shown at 36. Examples of such fault conditions include an open-circuit or short-circuit condition. If no fault is detected, then at 38 a check is made whether a flag labeled HOLD is asserted, indicating that the PSE 10 has been ordered to withhold operating power. If not, then power continues to be supplied at 34. When either a fault condition is detected at 36 or the HOLD flag is set at 38, then at 40 the PSE 10 powers down the channel, i.e., disconnects the DC supply from the cable 14, and re-enters the pre-operating mode 30.

In the pre-operating mode 30, at step 42 the PSE 10 performs a detection and classification operation to determine (1) whether the PD 12 is connected to the cable 14, and (2) the power class of the PD 12 if connected. In the POE specifications, a detection consists of supplying at least two distinct DC voltages (V1, V2) to the cable 14, measuring the resulting currents (I1, I2), and performing a resistance calculation (V2−V1)/(I2−I1). In the classification operation, the PSE 10 supplies a voltage in the range of 15-20 volts and measures the resulting current. Under published standards for power over Ethernet, different values of the current correspond to different classes of device with respect to the maximum amount of POE power drawn by the device. Under an original standard known as IEEE 802.3af, five classes were defined. Under a newer standard known as IEEE 802.3at, the number of classes is expanded and the classification operation involves the use of two successive classification voltages. The measured classification current is used to identify the power requirements of the PD 12 as specified in the standards.

At step 44, the PSE 10 determines whether the HOLD flag is asserted. If not, then it proceeds to step 46, at which it determines whether the result of the detection of step 42 corresponds to the 25 k resistive network specified in the standard (i.e., whether (V2−V1)/(I2−I1) is in an acceptable range around $2.5 \times 10^4$). If so, then the presence of the PD 12 is deemed to have been detected, and the PSE 10 enters the powered operating mode 32 to provide DC operating power to the PD 12. Otherwise, detection has failed and is simply repeated beginning again at 42. The values of V1 and V2 are specified to be less than 30 volts DC, well below the operating voltage Vsupp of 48 volts. Note that in some cases step 46 may be ignored (i.e., not performed).

In the embodiment of FIG. 2, it is assumed that the PSE power circuitry 20 can be controlled to intentionally withhold power as discussed above. This operation, reflected in the state of the HOLD flag, may be controlled by system software (for example) and may be utilized in furtherance of a power conservation scheme or some other goal. As a particular example, the system software may configure the PSE 10 to withhold power during particular (e.g., non-working) hours, or under other particular circumstances, in order to conserve power. The PSE 10 and PD 12 engage in a particular form of signaling which can influence this withholding of power. Specifically, the PSE 10 conducts repetitions of the detection/class operation 42 and looks for a predetermined sequence of values that convey a signaling message from the PD 12, and upon finding such a sequence takes appropriate action (which may include providing power notwithstanding the assertion of HOLD because the signaling indicates that a user of the PD 12 requires operating power, for example).

Thus returning to step 44, if the PSE 10 determines that it has been instructed to withhold power (HOLD is asserted), then it proceeds to step 52 in which it determines whether the signature sensed during the detect/class operation 42 represents a change since the last detect/class operation. If not, then the flow returns to step 42. If so, then the result is stored at step 54 and then at step 56 it is determined whether the set of stored signatures represents a sequence that conveys information from the PD 12. Examples of such a sequence include the sequences 25 k-open-25 k and 25 k-short-25 k as mentioned above. If a complete sequence is not detected, then control returns to the detect/class operation 42. If a complete sequence is detected, then at 58 the PSE 10 engages in a corresponding appropriate next action, examples of which are described below. The action may include providing a notification to higher-level control such as system software etc. As indicated by the dotted line 59, the next action 58 may lead to entering the powered operating mode 32 as well.

Figure 3A:
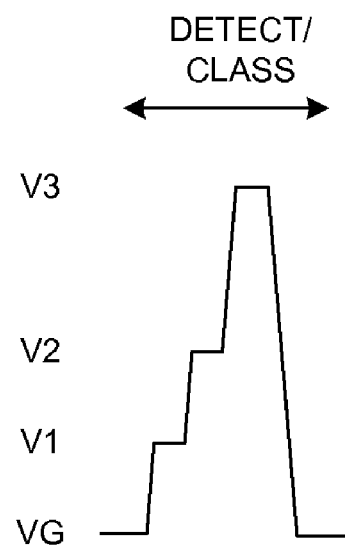
FIGS. 3(a) and 3(b) are waveform diagrams of signals that may be used in the system of FIG. 1.
Figure 3B:
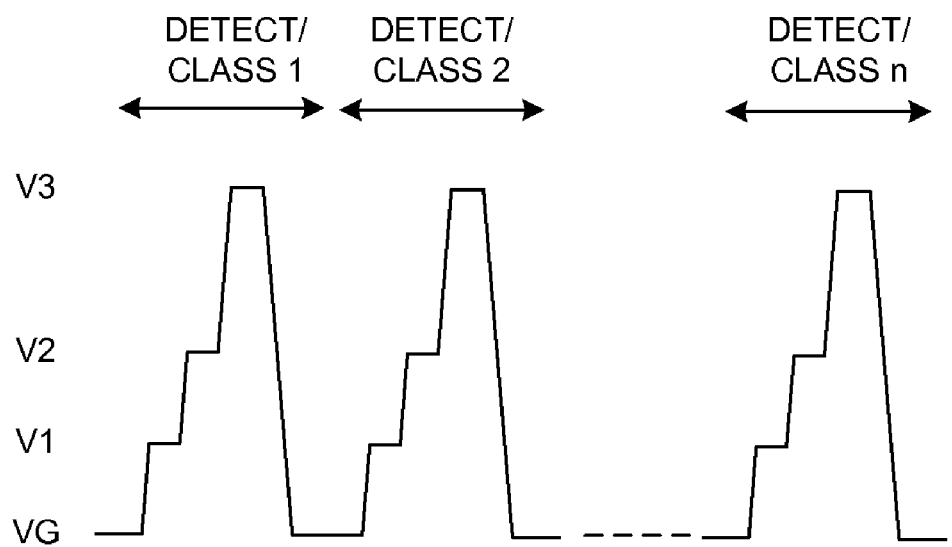

FIGS. 3(a) and 3(b) show examples of detection/classification voltages used in the flow of FIG. 2. FIG. 3(a) shows a single detect/class cycle, such as might be observed when HOLD is de-asserted, and FIG. 3(b) shows a sequence of detect/class cycles as might be observed when HOLD is asserted. For detection, standards call for applying a minimum of two voltage levels below 30 volts (e.g., V1 and V2 as shown, separated by at least two volts) and measuring the currents at each level. Such measurements enable a PSE to calculate the slope, or the resistance (Rsignature=dv/di) of the attached identity network resulting in a measurement of a resistor value. At the end of the detection process, classification is done either once or twice, where the voltage takes an excursion to a level between 15-20 v (V3 as shown) and the current is measured. A look-up table is used to determine the class of the device based on the measured current value. In its simplest form this is the detect/classification mechanism according to the standards.

Those skilled in the art will appreciate that the current actually conducted by the PD 12 in response to a given detect/class voltage can be measured in any of a variety of ways. One common configuration employs a sense resistor to develop a sense voltage proportional the current, along with an analog-to-digital converter or comparators.

Figure 4:
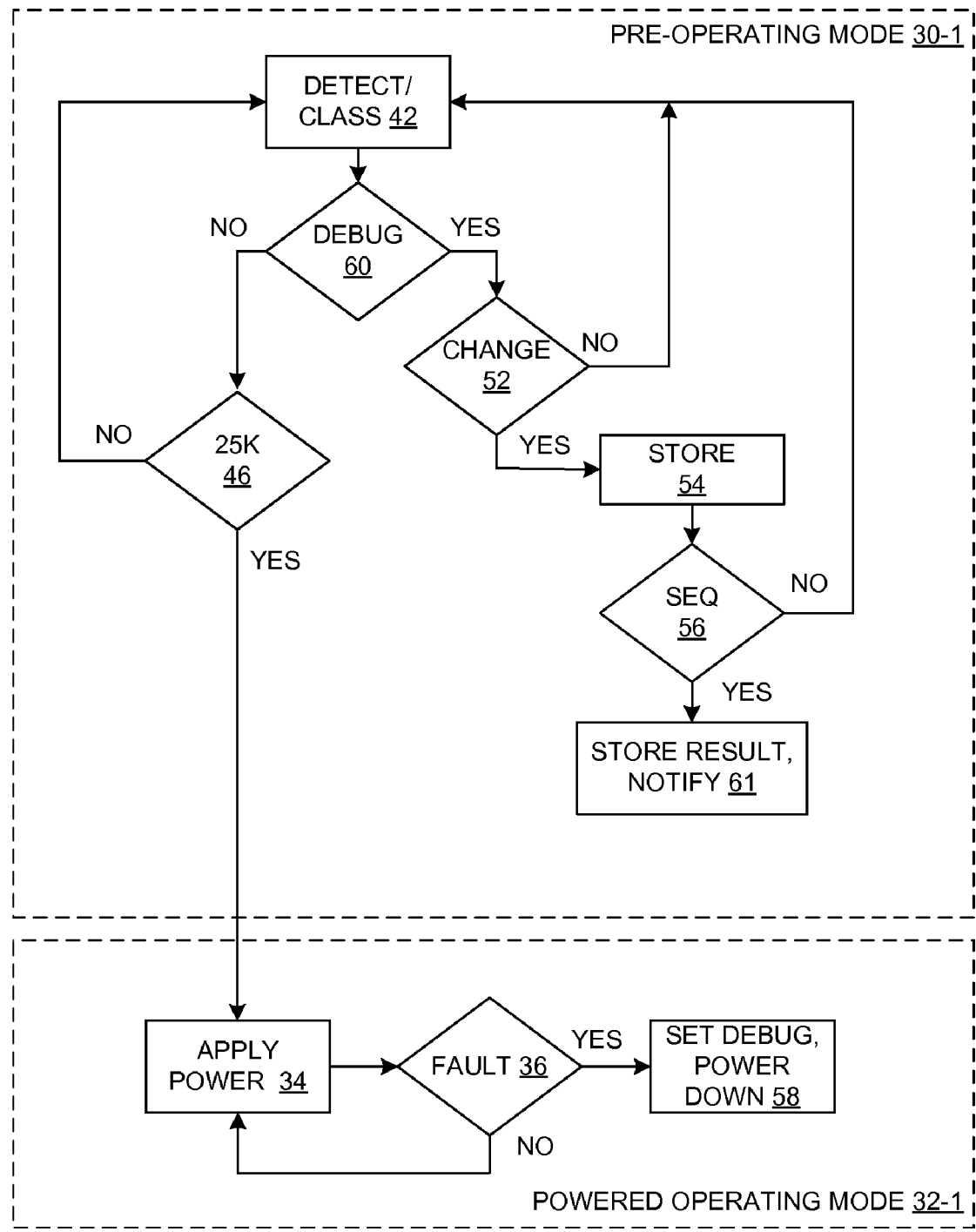
FIG. 4 is a flow diagram depicting a second method of operation of the system of FIG. 1 according to another embodiment.

FIG. 4 shows alternative operation employing a pre-operating mode 30-1 and powered operating mode 32-1. The overall operation and several particular steps are the same as in the operation of FIG. 2 and are not described again. The process of FIG. 4 provides for a fault analysis or "debug" mode of operation, where the analysis portion is described below with reference to FIG. 5. In the process of FIG. 4, if a fault is detected at step 36 then at step 58 a "debug" flag is set as part of powering-down the POE channel. This flag is checked at step 60 of the pre-operating mode 30-1. If the debug flag is not set, then it means that no fault was previously detected. If the debug flag is set, then upon the detection of a fault steps 52-56 are executed in order to extract signatures providing additional information about the fault condition. As an example, the additional signatures might be signatures indicating either an open-circuit (zero current drawn at a detection voltage) or a short-circuit (maximum current drawn). At 61, the resulting information is stored and a notification may be provided to a separate process. This information can also be used in conjunction with additional information as described below to diagnose the fault condition.

Figure 5:
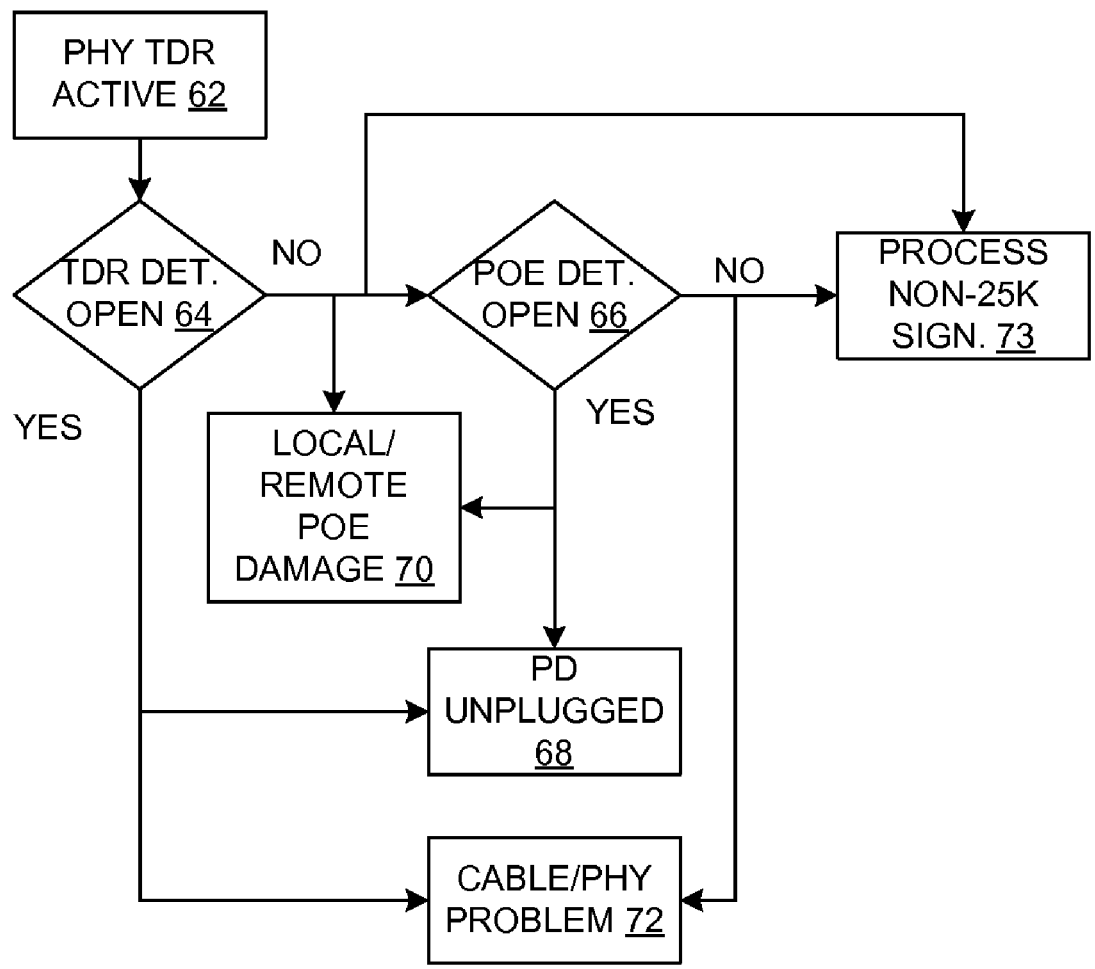
FIG. 5 is a flow diagram of a fault analysis operation used in conjunction with the method of FIG. 4.

FIG. 5 illustrates the fault detection and analysis process in more detail. At step 62 the PHY 18S is employing time-domain reflectometry (TDR) to monitor for any change in link conditions ahead of a fault condition. Using TDR, a signal in the data path is generated and sent over the cable in a differential manner over 1 or more pairs in the cable, and reflections are measured to detect the state of the cable, i.e., whether the cable is terminated properly, open (unplugged) or shorted. A query is sent to the PHY 18S at step 64. If the PHY TDR detected an open and the POE circuit detected an open at 66 (this constitutes an actual open condition), then it is concluded at 68 that the cable 14 is unplugged. If the POE circuitry detected an open but the PHY TDR did not detect an open, this may be due to a blown fuse at either the PD or the PSE (or both) or other cable or circuitry damage, as indicated at 70. If the PHY TDR detected an open condition and the POE circuitry does not detect an open, there may be a local cable or PHY problem as indicated at 72. For example, the POE circuitry may see sees a valid 25 k signature, and such a result might indicate one-wire damage in a pair. Another alternative is to see and process a non-25 k signature as indicated at 73. Additional fault data and analysis can be extracted when POE and PHY circuitry collaborate to debug a problem.

Figure 6:
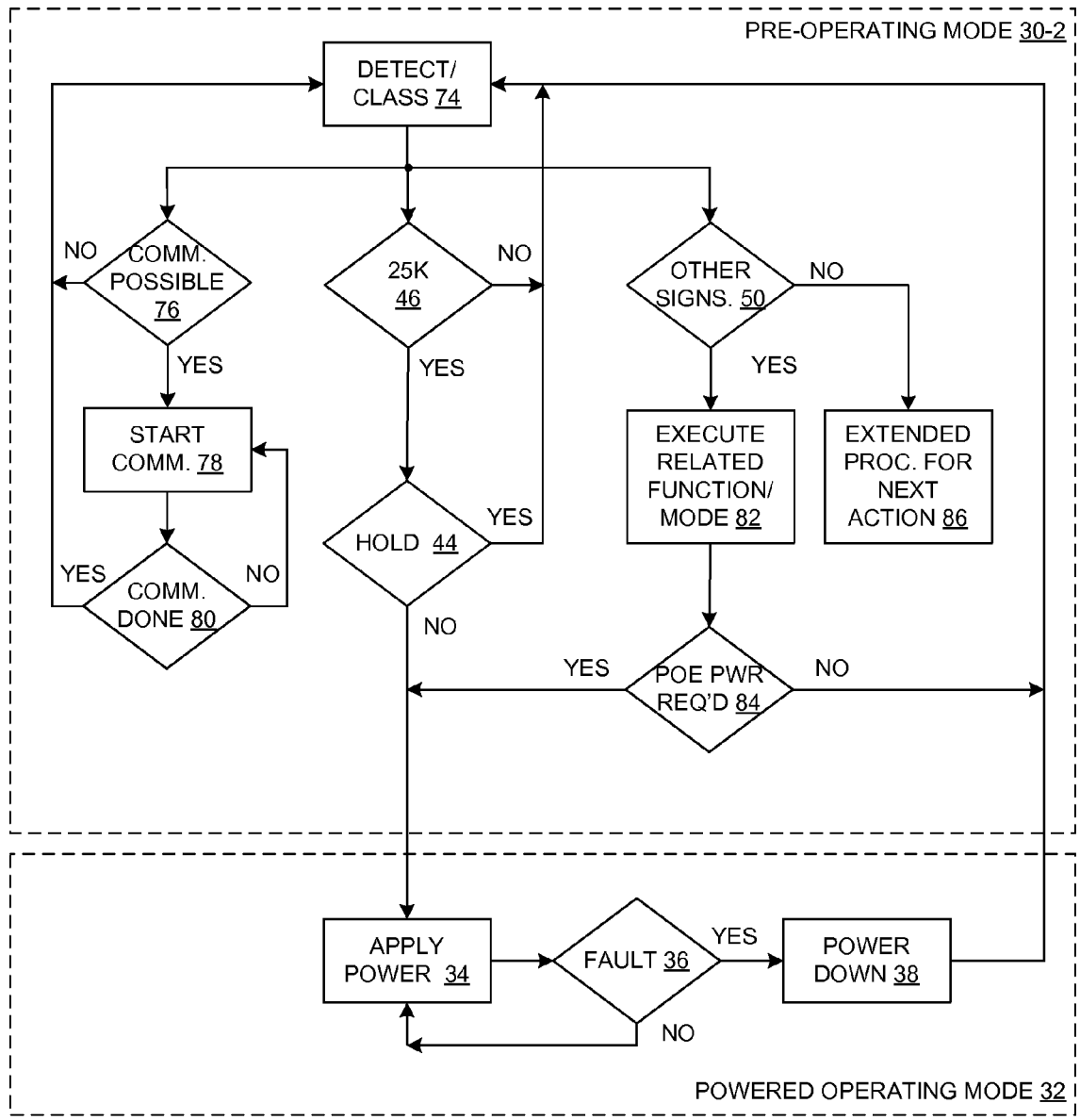
FIG. 6 is a flow diagram depicting a third method of operation of the system of FIG. 1 according to another embodiment.

FIG. 6 shows another alternative employing a slightly different pre-operating mode 30-2. Additional detections are executed and communications is active during detection via special protocols leading to a new detection mode. The details of the communications are not included herein, but the reader is directed to a related patent application entitled "Powered Communications Interface Providing Low-Speed Communications Between Power-Sourcing Equipment And Powered Device In Non-Powered Operating Mode", Ser. No. 12/268,560, the contents of which are incorporated herein by reference.

In FIG. 6, at step 74 multiple detections and communications signals are enabled, and multiple checks are made at steps 76, 46 and 50 (may be made serially or in parallel). At step 76 a detection is performed for an identity network or signal for a start of communications. If the PD 12 is capable of communicating over the POE channel, interactive communications starts at 78 and while active, the communications mode checks for end of communications at 80 leading the PSE 10 back to detection at 74. At 74 detection continues, or the PSE 10 may opt to enter a different mode, apply power to attached devices, or take any other action based on the communications that just completed. During the communications, the checks of steps 46 and 50 may or may not be active.

At step 50, the PSE 10 is actively searching for different identity networks (which may be a 12.5 k resistor, another particular resistor value, or some other classification sequence or current). Also at 50 the PSE is searching for signals or special identity networks for identifying devices capable of communications at 76.

It should be noted that at step 46, if a 25 k identity network is detected, a check for holding power at is done at 44, which may be desirable to enable attached PD devices to configure themselves and change their detection characteristics over time, or simply to conserve power. In the event that power is not being held, operation proceeds to the powered operating mode 32, which is described above.

The detection at step 50 may use non-standard or custom classification mechanisms and additional processing of the results of the 25 k discovery and the classification. For example, the dV/dI measurements may be analyzed further to search for different resistor values, and/or more classification cycles may be conducted and decoded. The nature of the detection and classification waveforms and pulses in voltage and time may change to deliver more results. When a valid identity network is found, then at step 82 a function or mode corresponding to the identity network is executed (including different protocols of communication modes, or entering other detection modes). Also, at 84 it is determined whether POE power is required, and if so then the powered operating mode 32 is entered. Optionally, extended processing is performed as shown at 86, where control may be passed back to firmware and the detection mode is exited. The firmware may apply power with a different voltage, turn on a security mode, restart detection in a different mode or take any action that is appropriate based on the detection results, including the detection of an identity network requiring an end to detections (a 'reset' of the detection mode signal).

Figure 7:
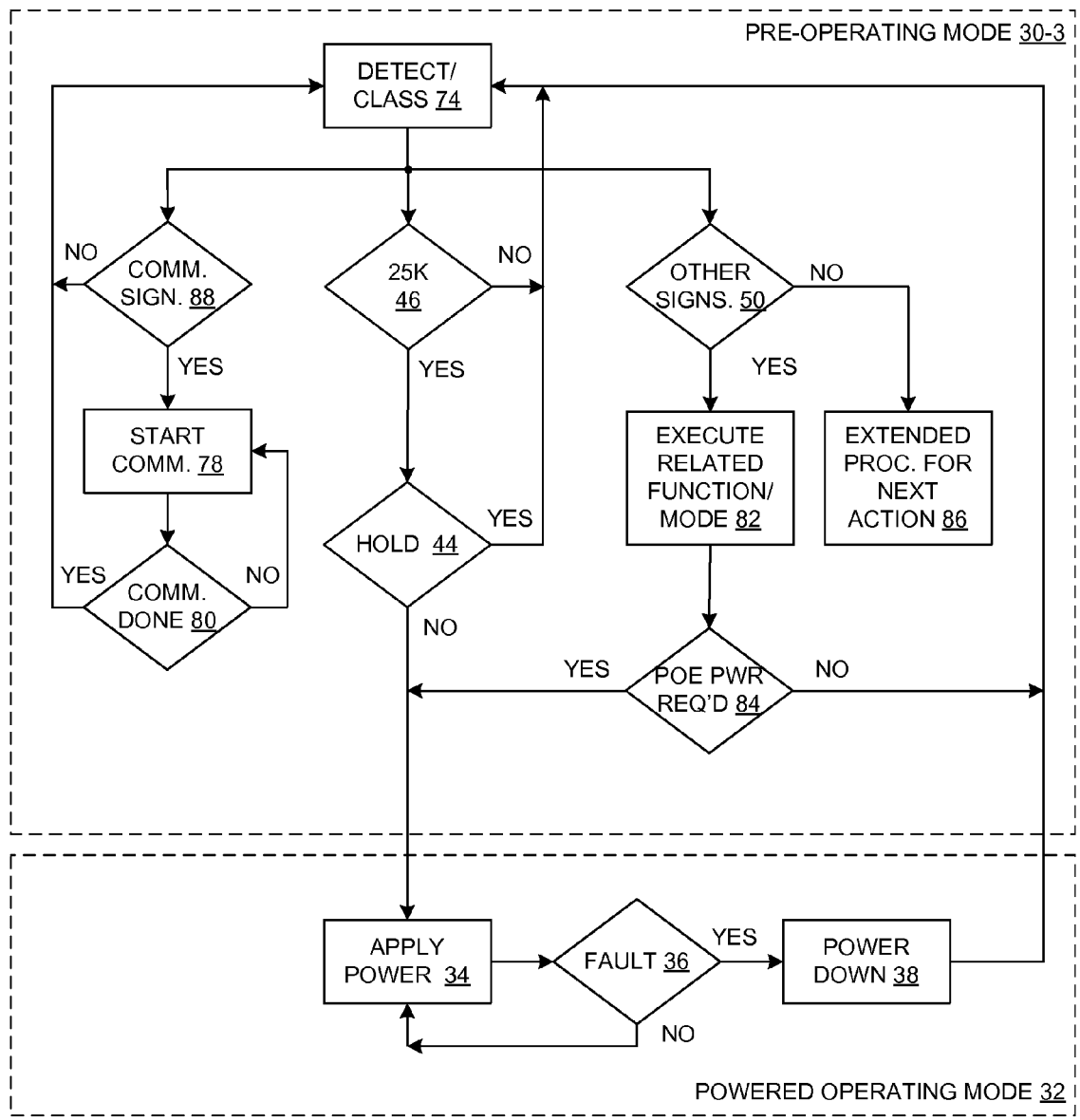
FIG. 7 is a flow diagram depicting a fourth method of operation of the system of FIG. 1 according to another embodiment.

FIG. 7 shows another alternative that is similar to that of FIG. 6 except with respect to the detection of communications abilities. Additional detections are executed and communications are activated only when a valid detection of a special signal or identity network broadcasting the availability of support for one or more communications protocol is completed. Specifically, the search for an identity network or signature to start communications is activated at 88 or 50. It is worth noting that multiple identity networks may be used to start different communications protocols including the protocol used in FIG. 6 where detections and communications are concurrently active. And at 74, only detection is activated, no attempt for communications takes place.

Figure 8:
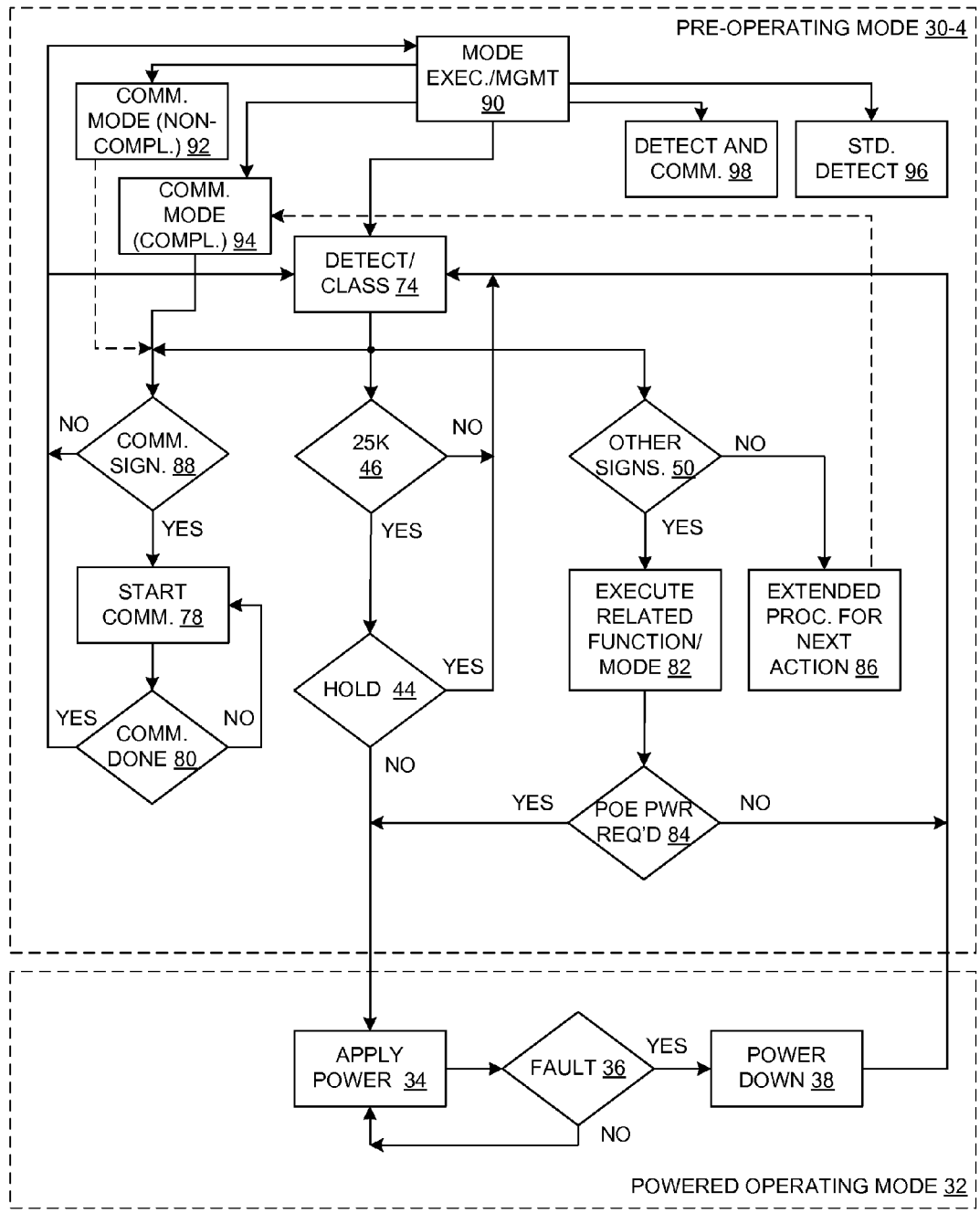
FIG. 8 is a flow diagram depicting a fifth method of operation of the system of FIG. 1 according to another embodiment.

FIG. 8 is a flow diagram for CPU control over the different detection, communication and detection/communication modes that may be possible in a PSE. A PSE may activate any mode at any time. A POE system of multiple PSE devices may activate any of the modes at any time. At step 90 control and management firmware is actively controlling what state the PSE 10 may have. Most of the time, the PSE 10 enables a mode and executes such mode indefinitely. In one mode, a standalone communications mode (non-standard compliant) may be activated at 92. Such activation may be based on the previous detection of an identity network. The fact that this mode is enabled does not imply successful communications. It is merely a way to signal and broadcast support for at least one communications protocol to attached devices. Once proper detections for support of the protocols among attached devices are done at 88, then communications may commence as described earlier. In addition, the return to 90 occurs at the end of communications at 80. Another standard-compliant mode of communications may be activated at 94 either during detections or in response to the detection of a special identity network as shown in the dotted line from step 86. A standard-compliant communications mode uses communications waveforms that comply with the specifications of published POE standards such as the IEEE 802.3af and 802.3at standards (communication signals may be embedded within compliant waveforms for example). Again, the fact that this mode is enabled does not imply successful communications. It is merely a way to signal and broadcast support for at least one communications protocol to attached devices. Once proper detections for support of said protocols among attached devices are done at 88, then communications may commence as described earlier. Yet another mode of detection may be enabled at 74, which has been described above. A simple, standard-compliant detection mode is shown at 96 and may be activated alone. At 98 a mode such as that of FIG. 6 may be activated. Also, modes such as those of FIGS. 2 and 4, and any additional modes that may be derivatives or combinations of these modes, may also be included.

Figure 9A:
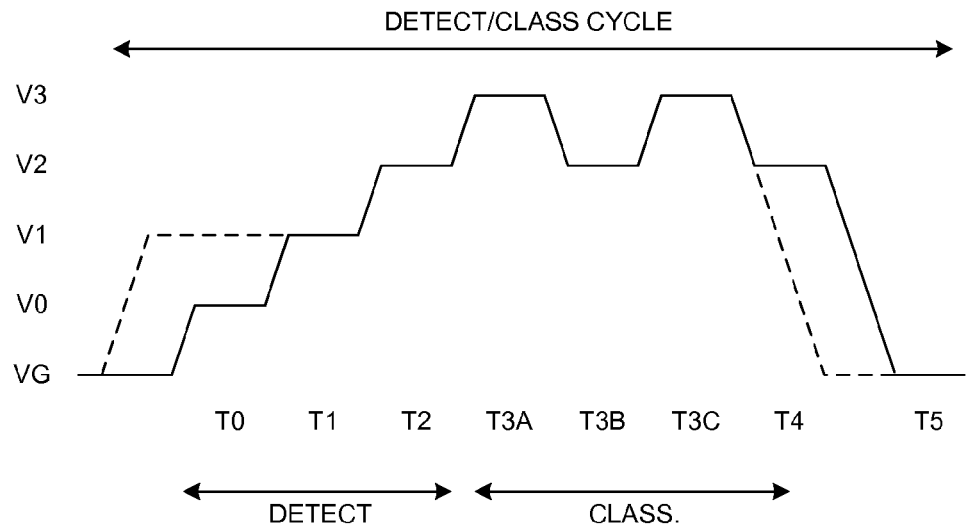
FIGS. 9(a) and 9(b) are waveform diagrams of signals that may be used in connection with the methods of FIGS. 6-8.

In order to accomplish the additional detections of steps 76, 50, etc., the PSE 10 may generate supplemental detection signals which may be entirely separate from the basic detection/classification signals or may be represented by certain modulation (either time or voltage) of the basic signals, and processes the measured returned current or signals in response to the modulations. FIG. 9(a) shows such a supplemental signal as providing an additional voltage of V2 at time T4 rather than immediately returning to VG (the latter operation indicated by the dotted line). In response to the presence of V2 at T4, the PD 12 may conduct a certain current value that corresponds to at least one additional identity network or signature which can be detected at step 76, 50 etc.

Figure 9B:
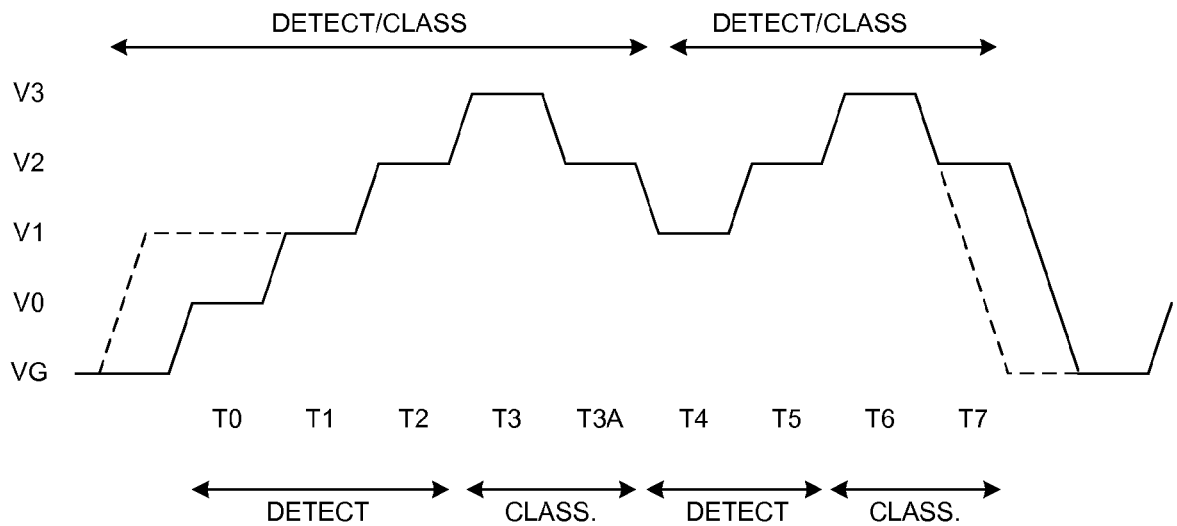

FIG. 9(b) shows similar detection signal but employing two detect and class cycles, each having one classification cycle. While the signals of both FIGS. 9(a) and 9(b) enable a maximum of two classification cycles and are both compliant with standards, many additional classification cycles are possible to extract a large set of identity networks. For many applications, more than two classification cycles may be deployed, once an attached device requests the need for conducting such additional classification cycles via a compliant identity network discovery. Such identity networks are not allowed for in the standards, and their extraction is described in the set of supplemental signals of FIG. 3(a), as discussed above. Also, the execution of multiple classification cycles presents a larger look-up table of possible identity networks.

While the above description shows the PD 12 as containing PHY circuitry 18 and being capable of high-speed communications with the PSE 10, in alternative embodiments the PSE 10 may be used with a PD that is a "power-only" device that may lack such PHY circuitry. That is, it may be desirable to employ a PD having an Ethernet connector so that it can be connected to a PSE solely to receive power but not for operational communications. One can imagine a charger cradle, for example, that receives POE power and provides a connection to rechargeable devices such as a cell phone, PDA, etc.

What is claimed is:

1. A method of operating a powered communications interface of a power-sourcing equipment, the powered communications interface including coupling circuitry operative to couple data signals between the power-sourcing equipment and conductors of the cable, the method comprising:

in a powered operating mode, supplying operating power to the powered device via the coupling circuitry in the form of a relatively high supply voltage across the conductors of the cable and a relatively high supply current through the conductors of the cable; and in a non-powered operating mode, (1) withholding the operating power from the powered device, and (2) applying a sequence of relatively low signaling voltages and relatively low signaling currents to the conductors of the cable via the coupling circuitry, the sequence of relatively low signaling voltages and currents including (a) first signaling voltages and currents of a detection and classification operation by which the presence and power requirements of the powered device are detected, and (b) second signaling voltages and currents by which the powered device provides additional information to the power-sourcing equipment, the additional information being encoded in the form of values and sequence of the second signaling currents conducted by the powered device in response to corresponding values and sequence of the second signaling voltages, wherein the power-sourcing equipment is provided with a control value indicating that the power-sourcing equipment is normally to withhold power even when the detection/classification operation indicates that the powered device is present;

and wherein the additional information indicates the existence of a special operating condition of the powered device which should override the normal withholding of power;

and wherein the powered operating mode is entered in response to receiving the additional information from the powered device.

2. A method according to claim 1, wherein at least initial ones of the second signaling voltages are compliant with published standards specifying the magnitude and timing of the signaling voltages.

3. A method according to claim 2, wherein subsequent ones of the second signaling voltages are not compliant with the published standards and constitute manufacturer-specific exchange of information between the power-sourcing equipment and the powered device.

4. A method according to claim 1, wherein the second signaling voltages and currents are of additional detection/classification operations operative to detect multiple identification networks of the powered device.

5. A method according to claim 4, wherein the additional detection/classification operations are performed in parallel.

6. A method according to claim 1, wherein the powered device is a power-only device lacking circuitry for performing high-speed communications via the communications channels.

7. A method according to claim 1, further comprising:
during the powered operating mode, (1) monitoring for the occurrence of a fault condition, and (2) in response to detection of the fault condition, ceasing to supply power to the powered device via the coupling circuitry and setting a debug flag indicating that the fault condition was detected; and
during a subsequent execution of the pre operatingnon-powered operating mode, (1) prior to applying the second signaling voltages and currents, checking whether the debug flag is set, and (2) only if the debug flag is set, then applying the second signaling voltages and currents and interpreting the additional information from the powered device as information pertaining to the fault condition.

8. A method according to claim 7, further comprising performing time-domain reflectometry to obtain TDR result information about the fault condition.

9. A method according to claim 1, wherein the detection and classification operation is active at the same time as the providing of additional information to the power-sourcing equipment.

10. A method according to claim 1, wherein the detection and classification operation and the providing of additional information to the power-sourcing equipment are active at different times.

11. A method according to claim 10, wherein the completion of one of the two activities of (1) the detection and classification operation, and (2) the providing of additional information to the power-sourcing equipment, leads to the initiation of the other of the two activities or the initiation of additional activities.

12. A power-sourcing equipment to be coupled to a powered device via a cable, comprising:
coupling circuitry operative to couple data signals between the power-sourcing equipment and conductors of the cable;
power circuitry connected to the coupling circuitry, the power circuitry being operative under control of power control signals to provide operating power to the powered device via the conductors of the cable; and
power control circuitry operative, when the power-sourcing equipment is coupled to the powered device via the cable, to generate the power control signals:
(i) in a powered operating mode, to control the power circuitry to supply the operating power to the powered device in the form of a relatively high supply voltage across the conductors of the cable and a relatively high supply current through the conductors of the cable; and
(ii) in a non-powered operating mode, to (1) control the power circuitry to withhold the operating power from the powered device, and (2) apply a sequence of relatively low signaling voltages and relatively low signaling currents to the conductors of the cable, including (a) first signaling voltages and currents of a detection and classification operation by which the presence and power requirements of the powered device are detected, and (b) second signaling voltages and currents by which the powered device provides additional information to the power-sourcing equipment, the additional information being encoded in the form of values and sequence of the second signaling currents conducted by the powered device in response to corresponding values and sequence of the second signaling voltages,
wherein the power-sourcing equipment is provided with a control value indicating that the power-sourcing equipment is normally to withhold power even when the detection/classification operation indicates that the powered device is present;
and wherein the additional information indicates the existence of a special operating condition of the powered device which should override the normal withholding of power; and
wherein the powered operating mode is entered in response to receiving the additional information from the powered device.

13. A power-sourcing equipment according to claim 12, wherein at least initial ones of the second signaling voltages are compliant with published standards specifying the magnitude and timing of the signaling voltages.

14. A power-sourcing equipment according to claim 13, wherein subsequent ones of the second signaling voltages are not compliant with the published standards and constitute manufacturer-specific exchange of information between the power-sourcing equipment and the powered device.

15. A power-sourcing equipment according to claim 12, wherein the second signaling voltages and currents are of additional detection/classification operations operative to detect multiple identification networks of the powered device.

16. A power-sourcing equipment according to claim 15, wherein the additional detection/classification operations are performed in parallel.

17. A power-sourcing equipment according to claim 12, wherein the power circuitry and power control circuitry are further operative to:
during the powered operating mode, (1) monitor for the occurrence of a fault condition, and (2) in response to detection of the fault condition, cease to supply power to the powered device via the coupling circuitry and set a debug flag indicating that the fault condition was detected; and
during a subsequent execution of the non-powered operating mode, (1) prior to applying the second signaling voltages and currents, check whether the debug flag is set, and (2) only if the debug flag is set, then apply the second signaling voltages and currents and interpreting the additional information from the powered device as information pertaining to the fault condition.

18. A power-sourcing equipment according to claim 17, further operative to perform time-domain reflectometry to obtain TDR result information about the fault condition.

19. A powered device for coupling to a power-sourcing equipment, comprising:
  coupling circuitry to be coupled to the power-sourcing equipment via a cable, the coupling circuitry being capable of transferring high-speed data communications signals between the powered device and conductors of the cable; and
  power circuitry and power control circuitry configured and operative to:
    (A) in a powered operating mode, receive operating power from the power-sourcing equipment via the coupling circuitry in the form of a relatively high supply voltage across the conductors of the cable and a relatively high supply current through the conductors of the cable; and
    (B) in a non-powered operating mode, (1) not receive the operating power from the power-sourcing equipment via the coupling circuitry, and (2) receive a sequence of relatively low signaling voltages and relatively low signaling currents from the power-sourcing equipment via the conductors of the cable and the coupling circuitry, the sequence of relatively low signaling voltages and currents including (a) first signaling voltages and currents of a detection and classification operation by which the presence and power requirements of the powered device are detected, and (b) second signaling voltages and currents by which the powered device provides additional information to the power-sourcing equipment, the additional information being encoded in the form of values and sequence of the second signaling currents conducted by the powered device in response to corresponding values and sequence of the second signaling voltages,
  wherein the additional information indicates the existence of a special operating condition of the powered device which should override a withholding of power occurring at the power-sourcing equipment.

20. A powered device according to claim 19, being a power-only device lacking circuitry for performing high-speed communications via the coupling circuitry.

21. A method of operating a powered communications interface of a power-sourcing equipment, the powered communications interface including coupling circuitry operative to couple data signals between the power-sourcing equipment and conductors of the cable, the method comprising:
  in a powered operating mode, supplying operating power to the powered device via the coupling circuitry in the form of a relatively high supply voltage across the conductors of the cable and a relatively high supply current through the conductors of the cable; and
  in a non-powered operating mode, (1) withholding the operating power from the powered device, and (2) applying a sequence of relatively low signaling voltages and relatively low signaling currents to the conductors of the cable via the coupling circuitry, the sequence of relatively low signaling voltages and currents including (a) first signaling voltages and currents of a detection and classification operation by which the presence and power requirements of the powered device are detected, and (b) second signaling voltages and currents by which the powered device provides additional information to the power-sourcing equipment, the additional information being encoded in the form of values and sequence of the second signaling currents conducted by the powered device in response to corresponding values and sequence of the second signaling voltages;
  wherein the second signaling voltages and currents are applied only in the event that the operating power is being withheld from the power device in response to a control value indicating that the operating power is to be withheld even when the detection/classification operation indicates that the powered device is present,
  and further including transitioning from the non-powered operating mode to the powered operating mode without applying the second signaling voltages and currents in the event that the control value does not indicate that the operating power is to be withheld when the detection/classification operation indicates that the powered device is present.

* * * * *

UNITED STATES PATENT AND TRADEMARK OFFICE
CERTIFICATE OF CORRECTION

PATENT NO. : 8,099,611 B2
APPLICATION NO. : 12/249101
DATED : January 17, 2012
INVENTOR(S) : Roger Karam Page 1 of 1

It is certified that error appears in the above-identified patent and that said Letters Patent is hereby corrected as shown below:

Claim 7, Column 11, Lines 20-34, A method according to claim 1, further comprising: during the powered operating mode, (1) monitoring for the occurrence of a fault condition, and (2) in response to detection of the fault condition, ceasing to supply power to the powered device via the coupling circuitry and setting a debug flag indicating that the fault condition was detected; and during a subsequent execution of the pre operatingnon-powered operating mode, (1) prior to applying the second signaling voltages and currents, checking whether the debug flag is set, and (2) only if the debug flag is set, then applying the second signaling voltages and currents and interpreting the additional information from the powered device as information pertaining to the fault condition should read --A method according to claim 1, further comprising: during the powered operating mode, (1) monitoring for the occurrence of a fault condition, and (2) in response to detection of the fault condition, ceasing to supply power to the powered device via the coupling circuitry and setting a debug flag indicating that the fault condition was detected; and during a subsequent execution of the non-powered operating mode, (1) prior to applying the second signaling voltages and currents, checking whether the debug flag is set, and (2) only if the debug flag is set, then applying the second signaling voltages and currents and interpreting the additional information from the powered device as information pertaining to the fault condition--.

Signed and Sealed this
Second Day of October, 2012

David J. Kappos
*Director of the United States Patent and Trademark Office*